(12) United States Patent
Ikeda et al.

(10) Patent No.: US 6,892,161 B2
(45) Date of Patent: May 10, 2005

(54) POWER ROLLER FOR TOROIDAL TYPE CONTINUOUSLY VARIABLE TRANSMISSON

(75) Inventors: Hiroyuki Ikeda, Hanyu (JP); Yuko Kamamura, Hanyu (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 10/348,065

(22) Filed: Jan. 17, 2003

(65) Prior Publication Data

US 2003/0110004 A1 Jun. 12, 2003

Related U.S. Application Data

(62) Division of application No. 09/836,133, filed on Apr. 16, 2001, now Pat. No. 6,553,330.

(51) Int. Cl.$^7$ ................................................ G01B 7/00
(52) U.S. Cl. ...................................................... 702/150
(58) Field of Search ................................ 702/150, 155; 623/6.4, 6, 21; 476/8, 73, 40; 475/216; 464/111; 451/123; 384/208, 203, 108; 359/413; 33/520

(56) References Cited

U.S. PATENT DOCUMENTS

| | | |
|---|---|---|
| 3,608,927 A | 9/1971 | Grosseau |
| 3,640,261 A | 2/1972 | Josey |
| 3,933,054 A | 1/1976 | Iseman |
| 4,846,832 A * | 7/1989 | Wichterle .................... 623/6.4 |
| 6,159,247 A * | 12/2000 | Klawitter et al. ......... 623/21.15 |

FOREIGN PATENT DOCUMENTS

| | | |
|---|---|---|
| JP | 59-44561 | 10/1984 |
| JP | 4-269608 | 9/1992 |
| JP | 4-269609 | 9/1992 |
| JP | 8-285506 | 11/1996 |
| SU | 78 1535 B | 12/1978 |

* cited by examiner

Primary Examiner—John Barlow
Assistant Examiner—Tung S Lau
(74) Attorney, Agent, or Firm—Christensen O'Connor Johnson Kindness PLLC (57) ABSTRACT

An intersection between a first circular arc traced around a given measuring point on a toroidal surface on one side by the extreme end of a segment with a length equal to the curvature radius of traction surfaces of discs and a second circular arc traced around a given measuring point on a toroidal surface on the other side by the extreme end of the segment is obtained in a cross section along the central axis of the power roller. A plurality of intersections are obtained by repeating the process for obtaining the intersection for each of different measuring points on the toroidal surfaces. That specific one of the intersections which is situated nearest to the reference surface of the power roller is selected and it is concluded that the selected intersection is the tilting center of the discs.

3 Claims, 7 Drawing Sheets

POWER ROLLER FOR TOROIDAL TYPE CONTINUOUSLY VARIABLE TRANSMISSON

This application is an division of application Ser. No. 09/836,133, filed Apr. 16, 2001, now U.S. Pat. No. 6,553,330.

CROSS-REFERENCE TO RELATED APPLICATIONS

This application is based upon and claims the benefit of priority from the prior Japanese Patent Application No. 2000-206926, filed Jul. 7, 2000, the entire contents of which are incorporated herein by reference.

BACKGROUND OF THE INVENTION

The present invention relates to a measuring method for obtaining, for example, the tilting center of a power roller for a toroidal type continuously variable transmission.

Figure 13:
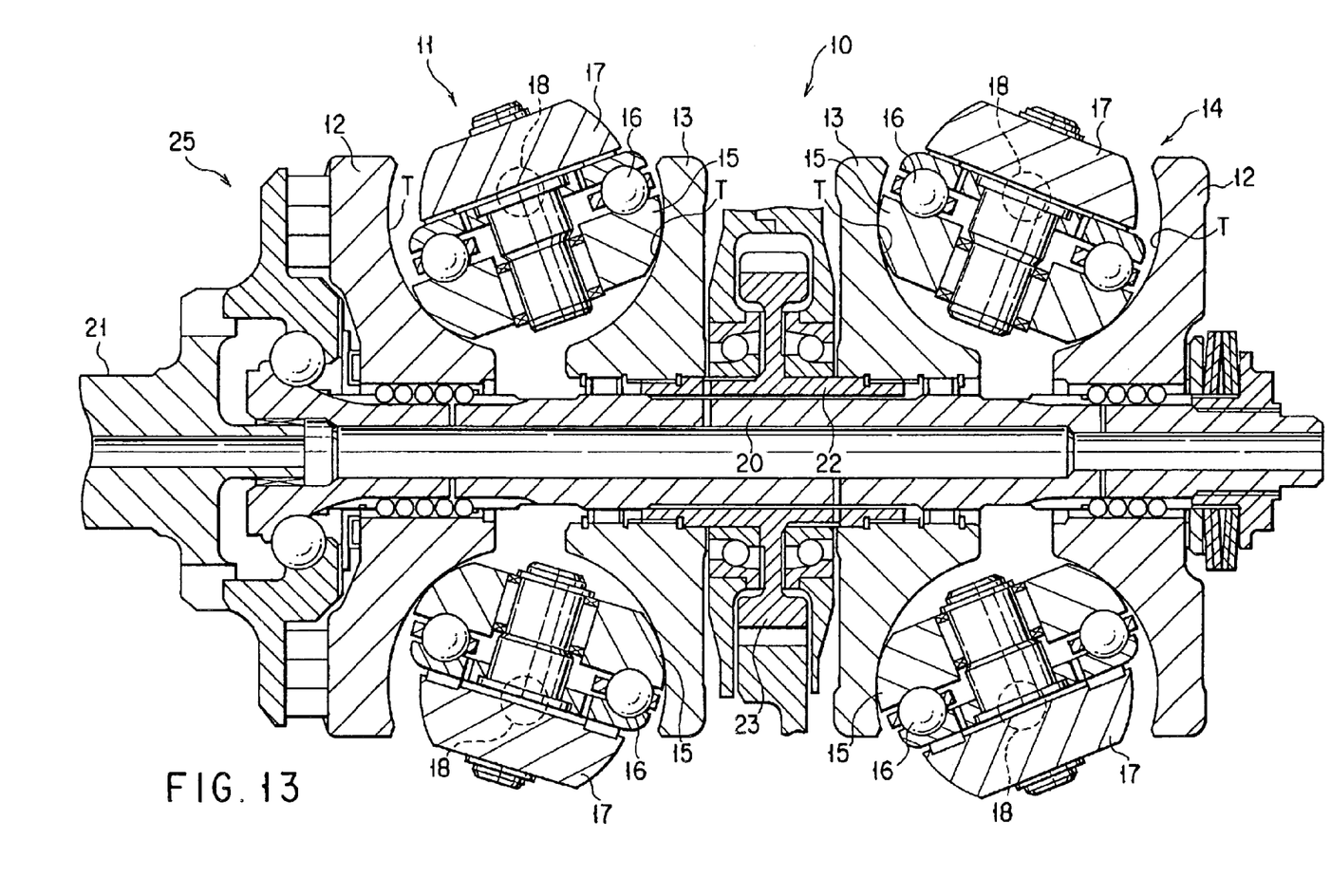
FIG. 13 is a longitudinal sectional view showing a part of a double-cavity half-toroidal type continuously variable transmission.

FIG. 13 shows a variator that constitutes a principal part of a double-cavity half-toroidal type continuously variable transmission 10. The transmission 10 comprises an input disc 12 and an output disc 13, which constitute a first cavity 11, and an input disc 12 and an output disc 13, which constitute a second cavity 14. A pair of power rollers 15 are provided between the input and output discs 12 and 13 of the first cavity 11. The outer peripheral surface of each power roller 15 is in contact with the respective traction surfaces T of the input and output discs 12 and 13. A pair of power rollers 15 are also provided between the input and output discs 12 and 13 of the second cavity 14.

Each power roller 15 is rotatably mounted on a trunnion 17 by means of a power roller bearing 16. The trunnion 17 is rockable around a trunnion shaft 18. The input discs 12 are rotatable integrally with an input shaft 20. The input shaft 20 is connected to a drive shaft 21 that is rotated by means of a drive source, such as an engine. The paired output discs 13 are connected to each other by means of a connecting member 22. An output gear 23 is provided on the connecting member 22. A loading cam mechanism 25 is located at the back of the input disc 12 of the first cavity 11. The rotation of the drive shaft 21 is transmitted to the input disc 12 by means of the loading cam mechanism 25. The rotation of each input disc 12 is transmitted to its corresponding output disc 13 through the power rollers 15. As the output discs 13 rotate, the output gear 23 rotates.

Figure 7:
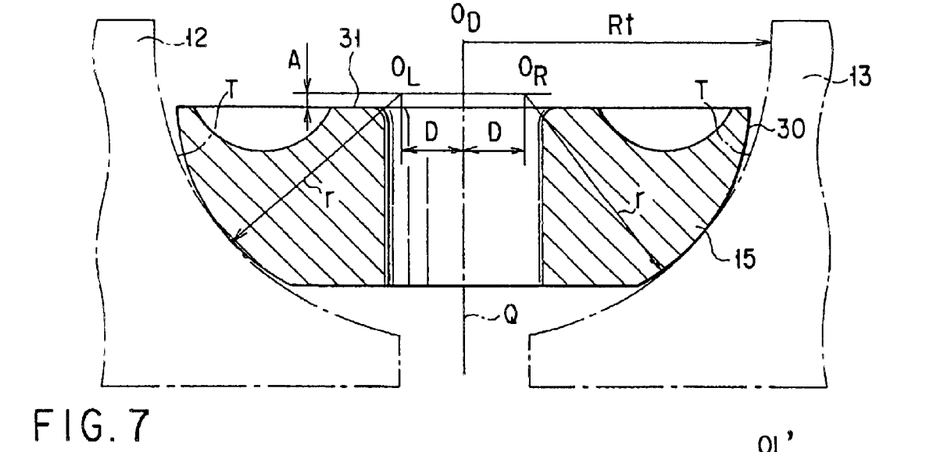
FIG. 7 is a sectional view of the power roller showing the curvature radius and a pair of curvature centers of the toroidal surface.

As shown in FIG. 7, each substantially hemispherical power roller 15 has toroidal surfaces 30 that touch the respective traction surfaces T of the input and output discs 12 and 13 and a reference surface 31 that extends at right angles to a central axis Q of the roller 15. Curvature centers $O_L$ and $O_R$ of the toroidal surfaces 30, which are situated bisymmetrically with respect to the central axis Q in a cross section of the power roller 15 along the central axis Q, are kept at a distance D from the central axis Q and a distance A from the reference surface 31 each. Each toroidal surface 30 is a convex surface with the curvature radius r. The toroidal surfaces 30 touch the respective traction surfaces T of the input and output discs 12 and 13 in a tiltable manner. Each traction surface T is a concave toroidal surface with a curvature radius Rt. In FIG. 7, $O_D$ designates the curvature center of the traction surface T.

If the curvature center $O_D$ of the traction surfaces T of the discs 12 and 13 is deviated from the tilting center of each power roller 15, slipping is caused at contact portions between the power roller 15 and the discs 12 and 13. This slipping lowers the torque transmission efficiency, and rolling fatigue that is attributable to heating shortens the life of the variator. If the deviation between the respective positions of the curvature center $O_D$ and the tilting center of the power roller 15 is great, a contact ellipse along which the roller 15 and the discs 12 and 13 are in contact is deviated from the boundaries of the effective traction surfaces. In this case, excessive pressure acts on the boundaries between a part of the contact ellipse and the effective traction surfaces, thereby drastically shortening the rolling fatigue life. Thus, the aforesaid positional deviation also exerts a bad influence upon an appropriate pressure at the rolling contact portions between the power roller 15 and the discs 12 and 13.

For these reasons, it is to be desired that the power rollers 15 should be rotated synchronously and that the tilting center of each power roller 15 and the curvature center $O_D$ of the traction surfaces of the discs 12 and 13 should be made coincident while this transmission is driven. To attain this, the curvature radius of the toroidal surfaces 30 of the power roller 15 and the tilting center of the roller 15 must be accurately obtained so that the discs 12 and 13 and the roller 15 can be positioned accurately.

Thereupon, the toroidal surfaces 30 of each power roller 15 are measured. A shape measurer of the straight-moving type and a three-dimensional measurer are known measuring devices for the power rollers 15. An alternative measuring device is developed and described in Jpn. Pat. Appln. KOKOKU Publication No. 59-44561. This device comprises a rotatable spindle, a micrometer attached to the spindle, a probe to be in contact with a curved surface of a workpiece, etc. In this measuring device, the probe is kept in contact with the workpiece to measure the distance of separation of the workpiece surface from a predetermined circle or circular arc. This measuring device can obtain the curvature radius r of the toroidal surfaces 30, distance 2D between the curvature centers $O_L$ and $O_R$, distance A from the reference surface 31 to the curvature centers $O_L$ and $O_R$, deviation of shape from an imaginary toroidal surface obtained by approximation to a representative circle with the curvature radius r, tilting center of each power roller 15, etc.

Figure 8:
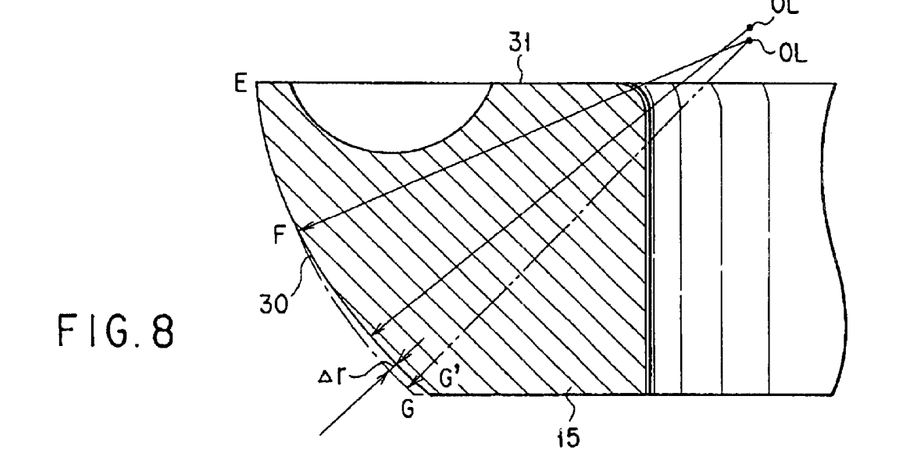
FIG. 8 is a sectional view of a part of the power roller showing an error of the curvature center of the toroidal surface.

Since each toroidal surface 30 has a narrow measurable region, it is subjected to representative circle approximation by computation based on measured values, its radius, curved surface shape error (distance of separation from the predetermined circle or circular arc), etc. are obtained, and the tilting center is obtained from those values. If each toroidal surface 30 that has a slight shape error Δr, such as deformation or waviness, which is caused when the power roller 15 is worked, is subjected to representative approximation, as shown in FIG. 8, therefore, there is a deviation or error between the curvature center $O_L$ of a normal shape E-F-G and a curvature center $O_L'$ of an actual shape E-F-G'. In consequence, an estimated position of the tilting center of the power roller 15 is inevitably subject to an error after the roller 15 and the discs 12 and 13 are assembled.

According to a known curved surface measuring method described in Jpn. Pat. Appln. KOKAI Publication No. 8-285506, the curvature radius and curvature center of a concave surface are measured by means of a plurality of reference spheres with different diameters and a cramping member. However, this method serves only to measure concave surfaces and cannot be applied to the measurement of convex surfaces such as toroidal surfaces of power rollers.

BRIEF SUMMARY OF THE INVENTION

Accordingly, the object of the present invention is to provide a measuring method for a power roller, capable of easily measuring various data, such as the tilting center of a power roller for a toroidal type continuously variable transmission, with reduced errors.

In order to achieve the above object, according to the present invention, there is provided a measuring method for a power roller for a toroidal type continuously variable transmission, the power roller having a reference surface extending at right angles to the central axis thereof and toroidal surface in contact with traction surfaces of discs, the measuring method comprising: a process for obtaining an intersection between a first circular arc traced around a measuring point on the toroidal surface on one side by the extreme end of a segment with a length equal to the curvature radius of the traction surfaces and a second circular arc traced around a measuring point on the toroidal surface on the other side by the extreme end of the segment, in a cross section along the central axis of the power roller; a process for obtaining a plurality of intersections by repeating the process for obtaining the intersection for each of different measuring points on the toroidal surfaces; a process for selecting that one of the intersections which is situated nearest to the reference surface and concluding that the selected intersection is the tilting center of the discs; and a process for obtaining the distance from the tilting center to the reference surface.

According to the present invention, moreover, there is provided a method for measuring a toroidal surface of a workpiece, such as a power roller, the workpiece having a reference surface extending at right angles to the central axis thereof, the measuring method comprising a process for bringing the workpiece into a concave spherical surface of a jig with a curvature radius greater than that of the toroidal surface and obtaining the distance from the reference surface to the center of the concave spherical surface.

According to the present invention, furthermore, there is provided a method for measuring a toroidal surface of a workpiece, the workpiece having a reference surface extending at right angles to the central axis thereof, the measuring method comprising: a first process for bringing the workpiece into contact with a first concave spherical surface of a first jig with a curvature radius greater than that of the toroidal surface, thereby obtaining the distance from the reference surface to the center of the first concave spherical surface; a second process for bringing the workpiece into contact with a second concave spherical surface of a second jig with a curvature radius greater than that of the first concave spherical surface, thereby obtaining the distance from the reference surface to the center of the second concave spherical surface; a third process for bringing the workpiece into contact with a third concave spherical surface of a third jig with a curvature radius greater than that of the second concave spherical surface, thereby obtaining the distance from the reference surface to the center of the third concave spherical surface; and a process for calculating the curvature radius and curvature center of the toroidal surface in accordance with at least the individual distances obtained in the first to third processes and the respective known curvature radii of the first to third concave spherical surfaces.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

The input and output discs 12 and 13 that constitute the variator of the half-toroidal type continuously variable transmission 10 shown in FIG. 13 have their respective traction surfaces T that have the common curvature radius Rt. Each of the power rollers 15 has the toroidal surfaces 30 with the curvature radius r that is smaller than the curvature radius Rt of the traction surface T.

Figure 1:
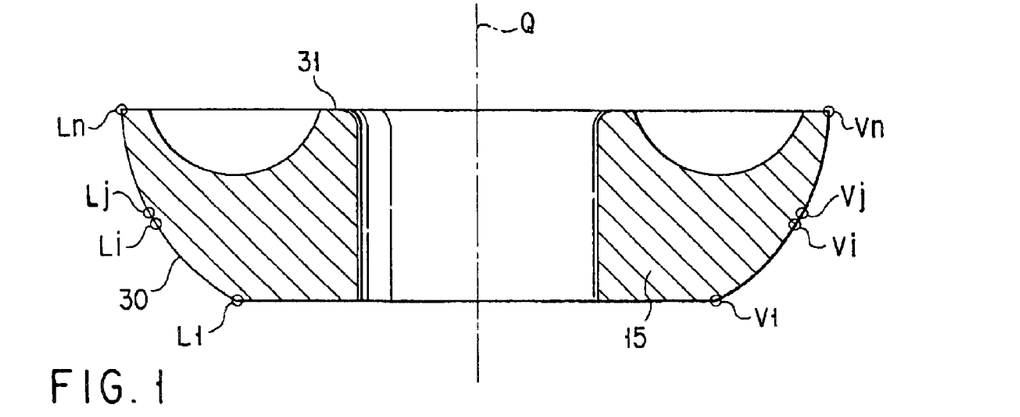
FIG. 1 is a sectional view showing measuring points on a toroidal surface of a power roller according to an embodiment of the present invention.

In a cross section along the central axis Q of each power roller 15, as shown in FIG. 1, the left- and right-hand curved portions individually form the convex toroidal surfaces 30 that are located bisymmetrically with respect to the central axis Q. Each toroidal surface 30 is measured by means of a measuring device, and is saved, as position data represented by coordinate axes (X, Y), for example, in a memory device such as a computer. A shape measurer of the straight-moving type or a three-dimensional measurer may be used as the measuring device. Alternatively, a device may be used in which a probe of a micrometer that moves along a predetermined circular arc is brought into contact with each toroidal surface 30 and the distance of separation of the probe from the circular arc is measured. In any case, the more measuring points, the less erroneous the result of computation is, so that the measuring points should be located in tens to hundreds of positions depending on the size of the power roller 15.

The saved position data on the measuring points are numbered as data on the left- and right-hand toroidal surfaces 30 for each cross section of each power roller 15. The data on the left-hand portions include from L1(X(1), Y(1)) to Ln(X(n), Y(n)), and the data on the right-hand portions include V1(X(1), Y(1)) to Vn(X(n), Y(n)). Although the position data are represented by the X and Y coordinates according to the present embodiment, polar coordinates (r, θ) may be used depending on the measuring method.

Figure 2:
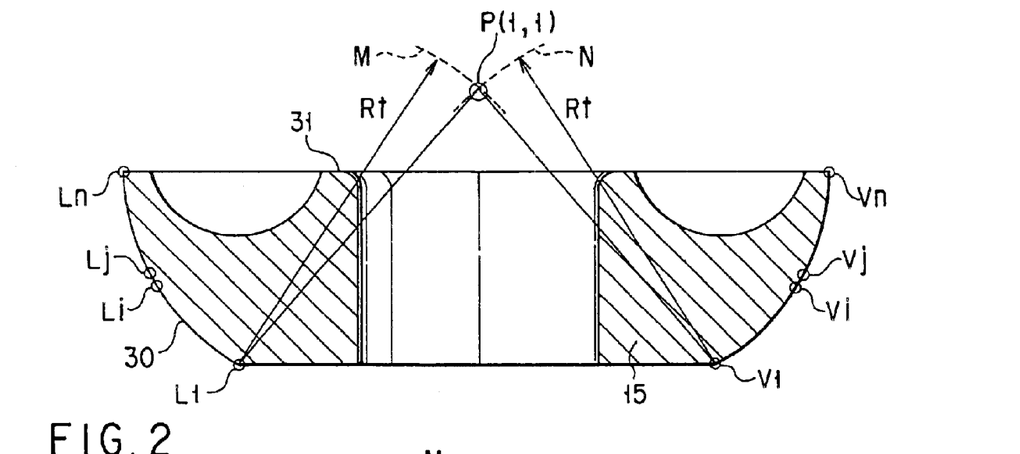
FIG. 2 is a sectional view of the power roller showing an intersection P(1, 1) obtained when circular arcs with a radius Rt are traced around measuring points L1 and V1 on the toroidal surface.

The following is a description of a method for obtaining the positions of contact between the power roller 15 and the discs 12 and 13 and the tilting center by using the position data. As shown in FIG. 2, for example, an intersection P(1, 1) between a first circular arc M that is traced around a measuring point L1 on the left-hand toroidal surface 30 by the extreme end of a segment for the curvature radius Rt and a second circular arc N that is traced around a measuring point V1 on the right-hand toroidal surface 30 by the extreme end of the segment for the curvature radius Rt is obtained.

Figure 3:
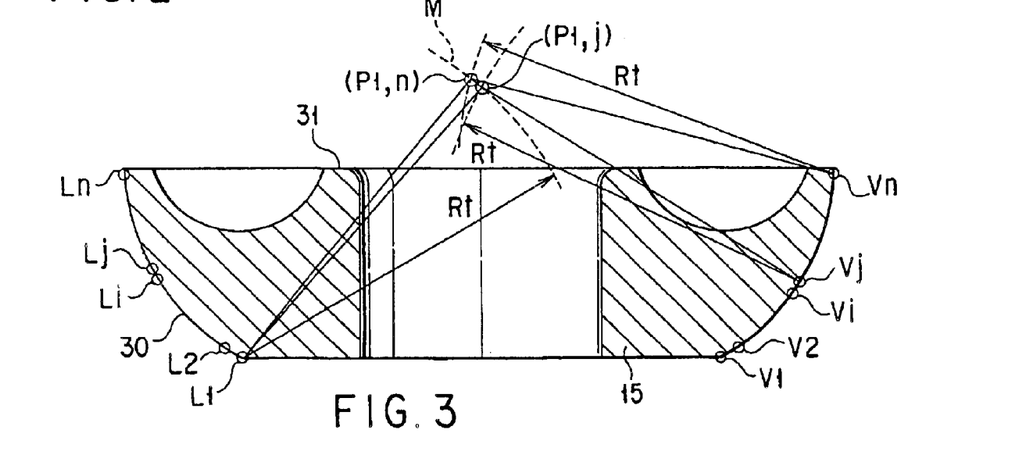
FIG. 3 is a sectional view of the power roller showing a plurality of intersections obtained when circular arcs with the radius Rt are traced around the measuring point L1 and measuring points Vj and Vn on the toroidal surface.

As shown in FIG. 3, moreover, intersections P(1, 2) to P(1, n) between the first circular arc M and circular arcs with Rt that are traced around the right-hand measuring points V2 to Vn are obtained. Further, intersections between a circular arc that is traced around the right-hand measuring point V1 by the extreme end of the segment for the curvature radius Rt and circular arcs with Rt that are traced around left-hand measuring points L2 to Ln are obtained. Every time all the measuring points L1 to Ln and V1 to Vn are combined in this manner, intersections P(1, 1) to P(n, n) between the circular arcs that are traced by the segments for Rt are obtained.

Figure 4:
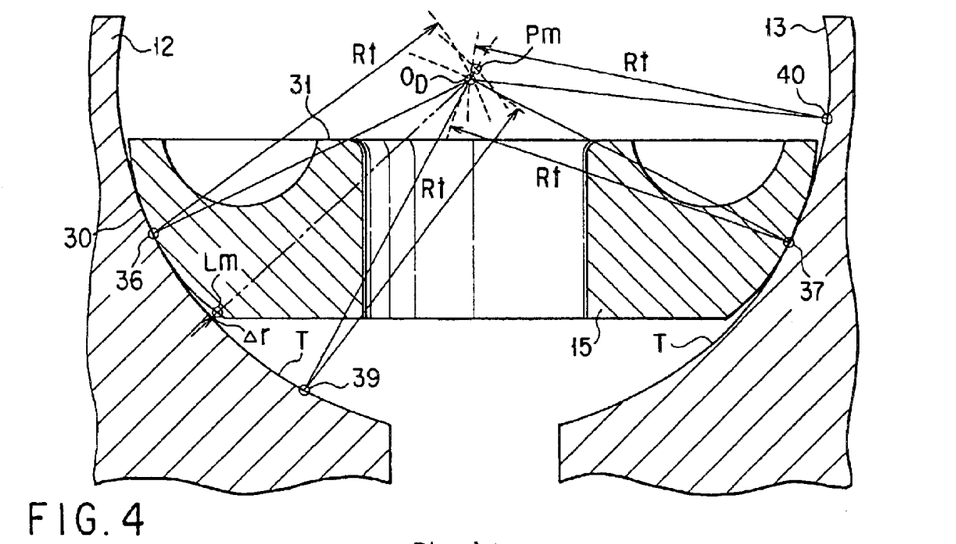
FIG. 4 is a sectional view showing the power roller in contact with input and output discs.

FIG. 4 shows a state in which the toroidal surfaces 30 of the power roller 15 are in contact with the respective traction surfaces T of the discs 12 and 13 at contact points 36 and 37. The contact point 36 can be represented by a measuring point Li of the left-hand toroidal surface 30, and the contact point 37 by a measuring point Vi on the right-hand toroidal surface 30. If circular arcs with the curvature radius Rt are traced around optional points 36 and 37 or 39 and 40 on the respective traction surfaces T of the discs 12 and 13, an intersection between these circular arcs is coincident with the curvature center $O_D$ of the traction surfaces T. In other words, the curvature center $O_D$ of the traction surfaces T lies on an intersection P(i, j) of circular arcs with Rt around the contact points 36 and 37 between the power roller 15 and the discs 12 and 13.

Figure 5:
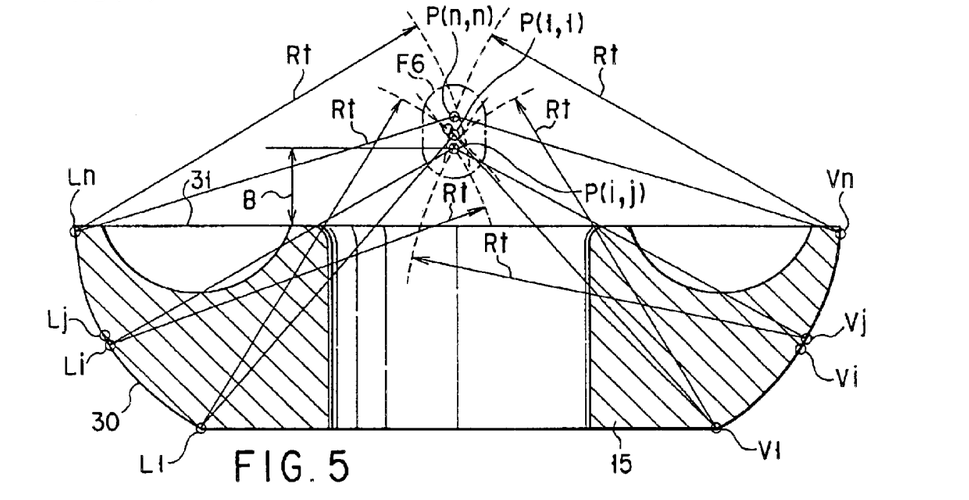
FIG. 5 is a sectional view of the power roller showing a plurality of intersections P obtained when circular arcs with the radius Rt are traced around a plurality of measuring points L1 to Ln and measuring points V1 to Vn on the toroidal surface.
Figure 6:
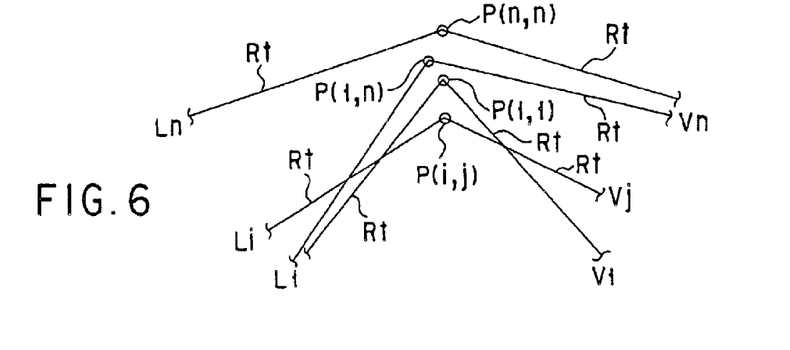
FIG. 6 is an enlarged view of a portion indicated by F6 in FIG. 5.

As shown in FIG. 4, an optional point Lm on each toroidal surface 30 of the power roller 15 in any other position than the contact point 36 between the toroidal surface 30 and the traction surface T of the disc 12 is separated at Δr from the traction surface T. If an intersection Pm is obtained by tracing a circular arc with Rt around the point Lm that is kept at Δr from the traction surface T, therefore, it is farther from the reference surface 31 than the curvature center $O_D$ of the traction surfaces T is. In other words, the intersection P(i, j) of the circular arcs with Rt around the contact points 36 and 37, out of all the intersections P(1, 1) to P(n, n), is situated nearest to the reference surface 31 of the power roller 15. As shown in FIGS. 5 and 6, therefore, the measuring points Li and Vj that are used to work out the intersection P(i, j) nearest to the reference surface 31, out of all the intersections P(1, 1) to P(n, n), can be regarded as the contact points (centers of a contact ellipse) between the power roller 15 and the discs 12 and 13.

Preferably, the curvature center $O_D$ of the respective traction surfaces T of the discs 12 and 13 should be coincident with the tilting center of the power roller 15, that is, the center of the trunnion shaft 18. The intersection P(i, j) serves as essential data in grasping the relative positions of the power roller 15 and the discs 12 and 13 when the variator of the toroidal type continuously variable transmission is assembled. With use of the same coordinate system for the measuring points Ln and Vn, therefore, the reference surface 31 of the power roller 15 is measured, and the distance from the reference surface 31 to the intersection P(i, j) is managed as a dimension B; as shown in FIG. 5. Errors of the variator can be reduced as the intersection P(i, j) and the dimension B thus obtained by measuring the toroidal surface 30 are managed as important data indicative of the tilting center of the power roller 15.

A measuring method for the curvature radius r or the like of the toroidal surfaces 30 of a workpiece, represented by the power roller 15, will now be described with reference to FIGS. 9 to 11. A workpiece W is measured by using three jigs 50A, 50B and 50C, for example. The jigs 50A, 50B and 50C, which are formed of a metal block each, have on their underside their respective concave spherical surfaces 51A, 51B and 51C, which are large enough to receive the workpiece W.

Figure 9:
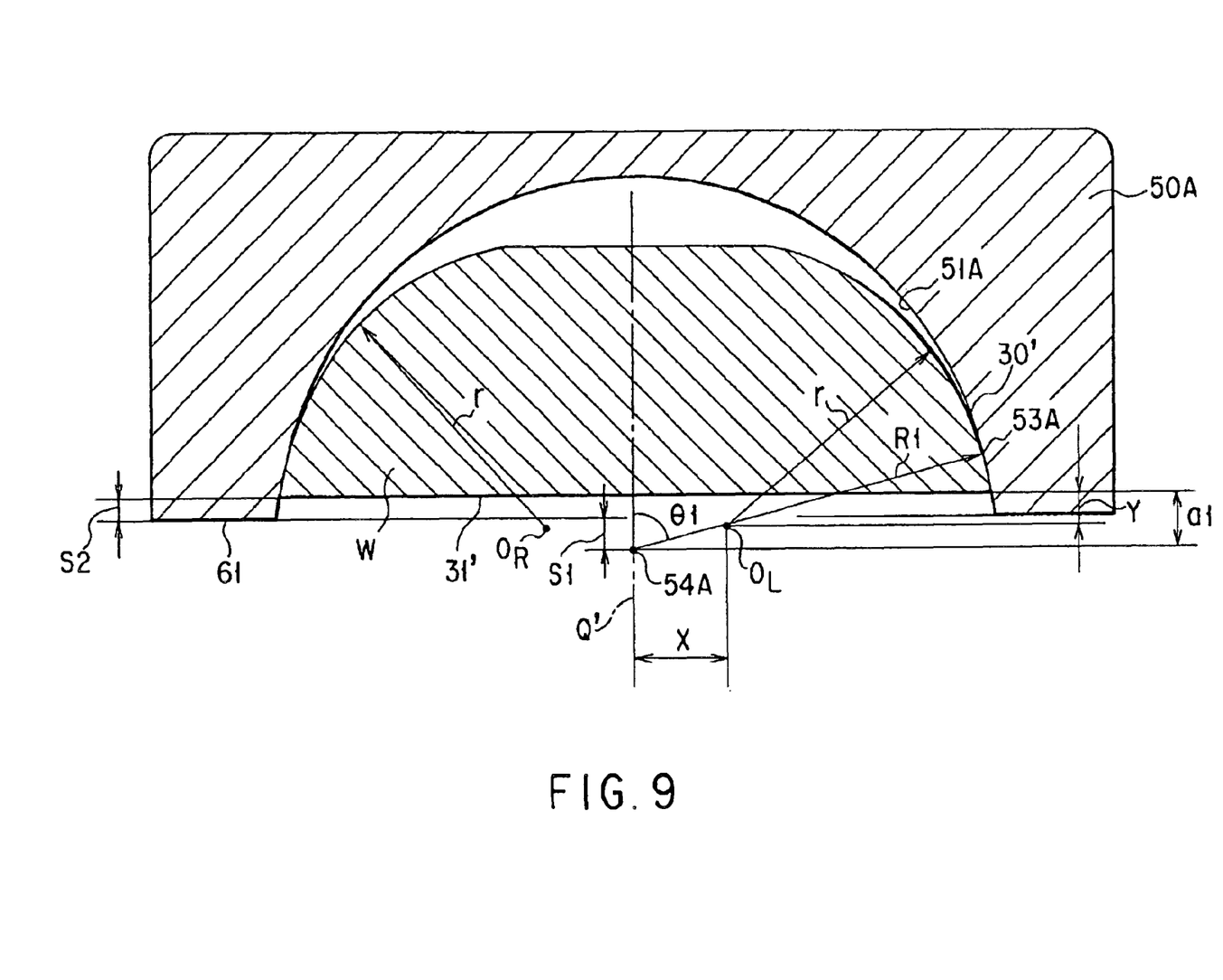
FIG. 9 is a sectional view showing a workpiece in contact with a first jig.

The first jig 50A shown in FIG. 9 has the first concave spherical surface 51A with a curvature radius R1 that is greater than the curvature radius r of the toroidal surface 30 of the workpiece W. The second jig 50B shown in FIG. 10 has the second concave spherical surface 51B with a curvature radius R2 that is greater than the curvature radius R1 of the first concave spherical surface 51A. The third jig 50C shown in FIG. 11 has the third concave spherical surface 51C with a curvature radius R3 that is greater than the curvature radius R2 of the second concave spherical surface 51B.

The workpiece W has a toroidal surface 30' with the curvature radius r around two points $O_L$ and $O_R$ as curvature centers in a cross section along its central axis Q'. The curvature centers $O_L$ and $O_R$ are kept at a distance D from the central axis Q' and at a distance A from a reference surface 31' of the workpiece W.

The workpiece W is put on a measuring table (not shown), and the toroidal surface 30' of the workpiece W brought into contact with the concave spherical surface 51A of the first jig 50A, as shown in FIG. 9. An angle θ1 between the central axis Q' of the workpiece W and a contact point 53A between the toroidal surface 30' and the spherical surface 51A is measured. Further, a distance a1 from the reference surface 31' of the workpiece W to a center 54A of the spherical surface 51A is measured.

Figure 10:
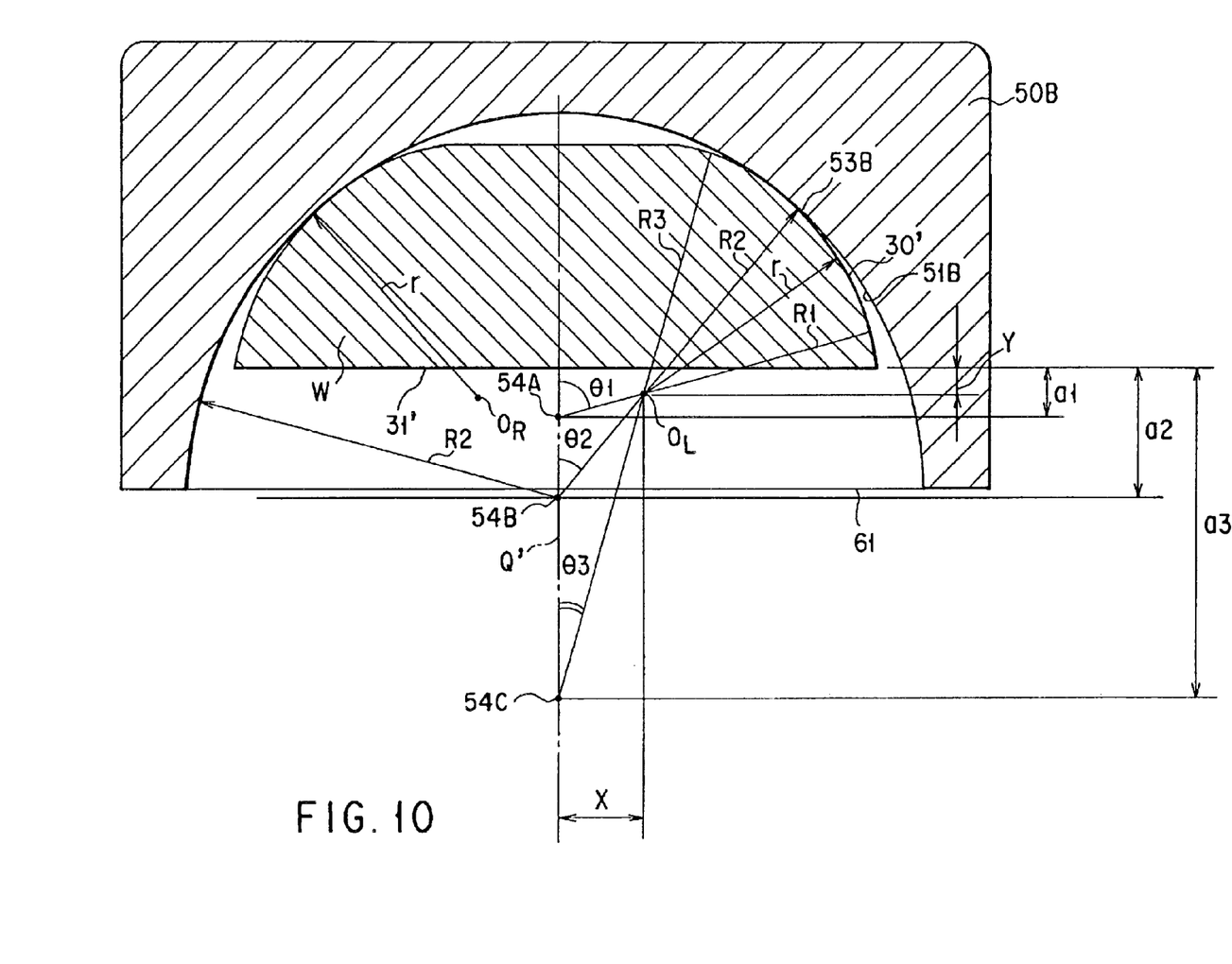
FIG. 10 is a sectional view showing the workpiece in contact with a second jig.

The toroidal surface 30' of the workpiece W is brought into contact with the concave spherical surface 51B of the second jig 50B, as shown in FIG. 10, and an angle θ2 between the central axis Q' of the workpiece W and a contact point 53B between the surfaces 30' and 51B is measured. Further, a distance a2 from the reference surface 31' of the workpiece W to a center 54B of the spherical surface 51B is measured.

Figure 11:
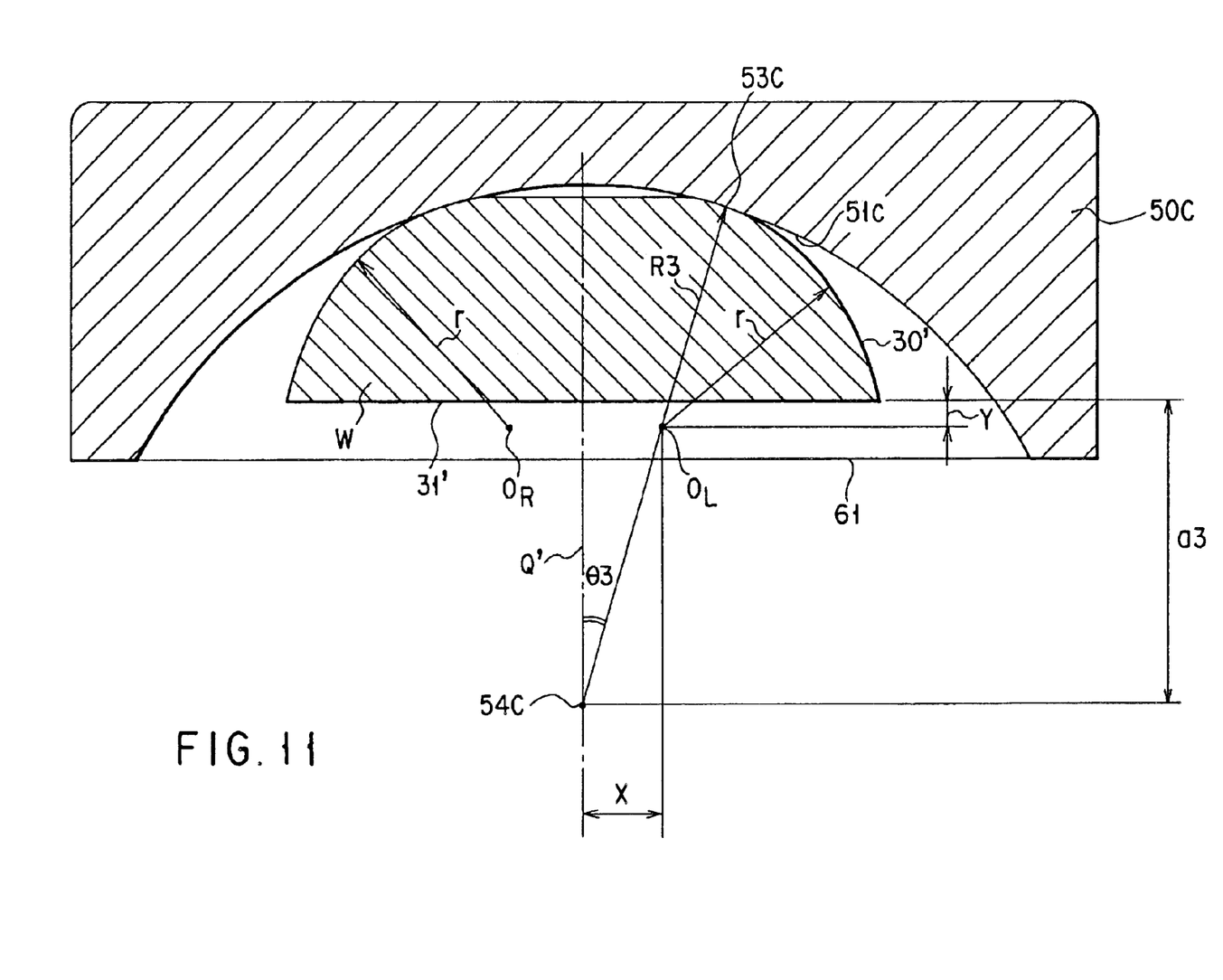
FIG. 11 is a sectional view showing the workpiece in contact with a third jig.

As shown in FIG. 11, moreover, the toroidal surface 30' of the workpiece W is brought into contact with the concave spherical surface 51C of the third jig 50C, and an angle θ3 between the central axis Q' of the workpiece W and a contact point 53C between the surfaces 30' and 51C is measured. Further, a distance a3 from the reference surface 31' of the workpiece W to a center 54C of the spherical surface 51C is measured.

Thus, the three angles θ1, θ2 and θ3 are obtained by means of the three jigs 50A, 50B and 50C. All the respective curvature radii R1, R2 and R3 of the concave spherical surfaces 51A, 51B and 51C are known values that are accurately measured in advance. Based on geometrical relations, the following six equations can be obtained:

$$(R1-r)\sin\theta1 = X, \quad (1)$$

$$(R1-r)\cos\theta1 = a1-Y, \quad (2)$$

$$(R2-r)\sin\theta2 = X, \quad (3)$$

$$(R2-r)\cos\theta2 = a2-Y, \quad (4)$$

$$(R3-r)\sin\theta3 = X, \quad (5)$$

$$(R3-r)\cos\theta3 = a3-Y, \quad (6)$$

where r, X and Y are unknown quantities.

In solving these simultaneous equations, θ1, θ2 and θ3 are first canceled as follows:

$$X^2/(R1-r)^2 + (a1-Y)^2/(R1-r)^2 = 1, \quad (7)$$

$$X^2/(R2-r)^2 + (a2-Y)^2/(R2-r)^2 = 1, \quad (8)$$

$$X^2/(R3-r)^2 + (a3-Y)^2/(R3-r)^2 = 1. \quad (9)$$

Then canceling X, we obtain $$(R1-r)^2 - (R2-r)^2 = (a1-Y)^2/(a2-Y)^2, \quad (10)$$

$$(R2-r)^2 - (R3-r)^2 = (a2-Y)^2/(a3-Y)^2, \quad (11)$$

$$(R3-r)^2 - (R1-r)^2 = (a3-Y)^2/(a1-Y)^2. \quad (12)$$

Rearranging these equations with respect to Y, we obtain $$Y = \{(a_1 - a_2)(a_1 + a_2) - (R_1 - r)^2 + (R_2 - r)^2\}/2 \cdot (a_1 - a_2), \quad (13)$$

$$= \{(a_2 - a_3)(a_2 + a_3) - (R_2 - r)^2 + (R_3 - r)^2\}/2 \cdot (a_2 - a_3), \quad (14)$$

$$= \{(a_3 - a_1)(a_3 + a_1) - (R_3 - r)^2 + (R_1 - r)^2\}/2 \cdot (a_3 - a_1). \quad (15)$$

Canceling Y, moreover, we obtain $$r = \{(a_2 - a_3) + (R_3^2 - R_1^2)/(a_3 - a_1) - \quad (16)$$
$$(R_1^2 - R_2^2)/(a_1 - a_2)\}/2\{(R_3 - R_1)/(a_3 - a_1) - $$
$$(R_1 - R_2)/(a_1 - a_2)\}$$

The curvature radius r of the toroidal surface 30' of the workpiece W is obtained in this manner. X and Y are also obtained by substituting the curvature radius r into equations (1) to (6). Those various calculations can be made by means of an information processor that includes an arithmetic circuit, such as a personal computer.

For example, R1, R2, R3, a1, a2, a3, r, X and Y are given as follows:

R1: 37.321 mm,
R2: 40.000 mm,
R3: 57.321 mm,
a1: 6.895 mm,
a2: 12.071 mm,
a3: 31.390 mm,
r: 30.000 mm,
X: 7.071 mm,
Y: 5.000 mm.

The distances a1, a2 and a3 can be also calculated after previously measuring a distance S1 (example of which is shown in FIG. 9) from an end face 61 of each of the jigs 50A, 50B and 50C to the curvature center 54A, 54B or 54C of each corresponding concave spherical surface 51A, 51B or 51C and then obtaining a distance S2 (example of which is shown in FIG. 9) between the end face 61 of the jig and the reference surface 31' of the workpiece by means of the jig 50A, 50B or 50C.

Figure 12:
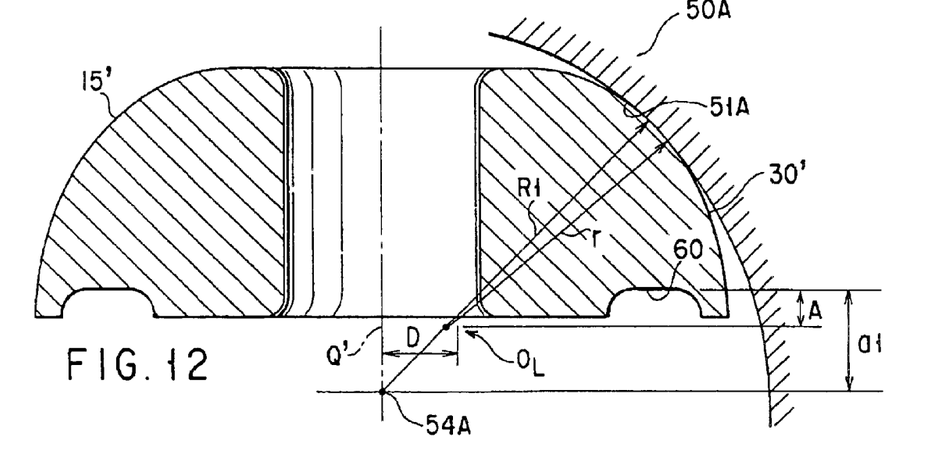
FIG. 12 is a sectional view showing a power roller, an example of the workpiece, in contact with a jig.

According to the embodiment described above, an end face of the workpiece W is used as the reference surface 31'. Alternatively, however, a bearing receiving groove 60 of a power roller 15' may be used as a reference surface, as shown in. 12. FIG. 12 shows a state in which the toroidal surface 30' of the power roller 15' is in contact with the concave spherical surface 51A of the first jig 50A.

Although the three jigs 50A, 50B and 50C are used in the embodiment described above, four or more jigs may be used to equate measured data so that the curvature radius r and the curvature centers $O_L$ and $O_R$ can be obtained with higher accuracy. Thus, the number of jigs is not limited.

If any one of the three values r, X and Y that represent the toroidal surface 30' of the workpiece W is known, the remaining two values can be obtained from the result of measurement by means of two jigs (e.g., first and second jigs 50A and 50B) with different curvature radii. In grinding the toroidal surface 30' by means of a formed grinding stone, for example, the curvature radius r of the toroidal surface 30' is subject to an error smaller than that of the curvature center of the surface 30' that depends on the position of bite of the grinding stone, since the curvature radius r is settled depending on the dressing. If the curvature radius r is previously measured by means of a device for measuring the channel diameter of the formed grinding stone, Y can be obtained from equation (13) and X from equations (7) and (8).

As described above, the curvature radius and curvature centers of a workpiece can be obtained by only bringing the respective concave spherical surfaces of a plurality of jigs with different curvature radii into contact with a curved surface (e.g., toroidal surface) of the workpiece and measuring the distance between the center of each concave spherical surface and the reference surface of the workpiece. Thus, operations for dimensional adjustment in a machining process of the workpiece and size selection for a large number of workpieces can be carried out efficiently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for measuring a toroidal surface of a power roller of a toroidal type continuously variable transmission, the measuring method comprising:

providing a power roller of a toroidal type continuously variable transmission having a reference surface extending at right angles to a central axis thereof; and bringing the cower roller of a toroidal type continuously variable transmission into contact with a concave spherical surface of a jig with a curvature radius greater than that of the toroidal surface and obtaining the distance from the reference surface to the center of the concave spherical surface.

2. A method for measuring a toroidal surface of a power roller of a toroidal type continuously variable transmission, the measuring method comprising:

providing a power roller of a toroidal type continuously variable transmission having a reference surface extending at right angles to a central axis thereof;

a first process for bringing the power roller of a toroidal type continuously variable transmission into contact with a first concave spherical surface of a first up with a curvature radius greater than that of the toroidal surface, thereby obtaining the distance from the reference surface to the center of the first concave spherical surface;

a second process for bringing the power roller of a toroidal type continuously variable transmission into contact with a second concave spherical surface of a second up with a curvature radius greater than that of the first concave spherical surface, thereby obtaining the distance from the reference surface to the center of the second concave spherical surface;

a third process for bringing the power roller of a toroidal type continuously variable transmission into contact with a third concave spherical surface of a third jig with a curvature radius greater than that of the second concave spherical surface, thereby obtaining the distance from the reference surface to the center of the third concave spherical surface; and a process for calculating the curvature radius and curvature center of the toroidal surface in accordance with at least the individual distances obtained in the first to third processes and the respective known curvature radii of the first to third concave spherical surfaces.

3. A method for measuring a toroidal surface of a power roller of a toroidal type continuously variable transmission, the measuring method comprising:

providing a power roller of a toroidal type continuously variable transmission with a known curvature radius, the power roller of a toroidal type continuously variable transmission having a reference surface extending at right angles to the central axis thereof;

a first process for bringing the power roller of a toroidal type continuously variable transmission into contact with a first concave spherical surface of a first jig with a curvature radius greater than that of the toroidal surface, thereby obtaining the distance from the reference surface to the center of the first concave spherical surface;

a second process for bringing the cower roller of a toroidal type continuously variable transmission into contact with a second concave spherical surface of a second up with a curvature radius greater than that of the first concave spherical surface, thereby obtaining the distance from the reference surface to the center of the second concave spherical surface; and a process for calculating the curvature center of the toroidal surface in accordance with at least the individual distances obtained in the first and second processes.

* * * * *

UNITED STATES PATENT AND TRADEMARK OFFICE
CERTIFICATE OF CORRECTION

PATENT NO. : 6,892,161 B2
DATED : May 10, 2005
INVENTOR(S) : Y. Kamamura

It is certified that error appears in the above-identified patent and that said Letters Patent is hereby corrected as shown below:

Title page,
Item [12], "Ikeda et al." should read -- Kamamura --.
Item [75], Inventors, "Hiroyuki Ikeda, Hanyu (JP); Yuko Kamamura, Hanyu (JP)" should read -- Yuko Kamamura, Hanyu (JP) --.
Insert Item -- [30] Foreign Application Priority Data
        Jul. 7. 2000    JP    2000-206926 --.

Column 8,
Line 67, "cower" should read -- power --.

Column 9,
Lines 14 and 23, "up" should read -- jig --.

Signed and Sealed this

Thirtieth Day of August, 2005

JON W. DUDAS
*Director of the United States Patent and Trademark Office*